United States Patent [19]

Farkas et al.

[11] Patent Number: 5,081,162

[45] Date of Patent: Jan. 14, 1992

[54] PROCESS FOR PRODUCING FOAMED POLYMERS

[75] Inventors: Paul V. Farkas, Willowdale; J. A. Duley, King City, both of Canada

[73] Assignee: Woodbridge Foam Corporation, Ontario, Canada

[21] Appl. No.: 554,519

[22] Filed: Jul. 20, 1990

Related U.S. Application Data

[63] Continuation-in-part of Ser. No. 316,185, Feb. 27, 1989.

[51] Int. Cl.⁵ .............................................. C08G 18/14
[52] U.S. Cl. .................................................. 521/133
[58] Field of Search .......................................... 521/133

[56] References Cited

U.S. PATENT DOCUMENTS

| | | | |
|---|---|---|---|
| 2,807,595 | 9/1957 | Brown | 521/106 |
| 2,984,631 | 5/1961 | Talalay et al. | 521/66 |
| 3,065,501 | 11/1962 | Gasmire | 264/28 |
| 3,110,552 | 11/1963 | Voelker | 264/45.2 |
| 3,281,379 | 10/1966 | Fontaine et al. | 521/114 |
| 3,288,732 | 11/1966 | Chapman et al. | 521/131 |
| 3,429,837 | 2/1969 | Langrish et al. | 521/172 |
| 3,468,987 | 9/1969 | Willy | 264/28 |
| 3,538,203 | 11/1970 | Overcashier et al. | 264/53 |
| 3,590,012 | 6/1971 | Hauptmann et al. | 521/51 |
| 3,592,628 | 7/1971 | Wuenscher | 75/20 F |
| 3,745,203 | 7/1973 | Harper | 264/48 |
| 3,787,542 | 1/1974 | Gallagher et al. | 264/51 |
| 3,808,300 | 4/1974 | Miyamoto et al. | 435/92 |
| 3,823,099 | 7/1974 | Doyle | 521/120 |
| 3,904,557 | 9/1975 | Leverette et al. | 521/159 |
| 4,263,408 | 4/1981 | Meyborg et al. | 321/51 |
| 4,289,856 | 9/1981 | Yamamoto et al. | 521/51 |
| 4,297,442 | 10/1981 | Blahak | 521/107 |
| 4,313,873 | 2/1982 | Lim | 524/611 |
| 4,343,912 | 8/1982 | Lim | 521/90 |
| 4,384,048 | 5/1983 | Bathgate | 521/89 |
| 4,399,087 | 8/1983 | Akiyama et al. | 264/153 |
| 4,424,287 | 1/1984 | Johnson et al. | 54/74 |
| 4,451,587 | 5/1984 | Keshi et al. | 521/171 |
| 4,757,096 | 7/1988 | Berthevas et al. | 521/163 |

FOREIGN PATENT DOCUMENTS 707380   4/1965  Canada .
2116574A 9/1983  United Kingdom .

*Primary Examiner*—Maurice J. Welsh
*Attorney, Agent, or Firm*—Nixon & Vanderhye

[57] ABSTRACT

A process for producing a foamed polymer, particularly a polyurea foam, comprises reacting an isocyanate compound and at least one active hydrogen-containing compound in the presence of a heterogeneous blowing agent. The heterogeneous blowing agent is a permanent gas and is used at a temperature and a pressure thereby rendering it in the form of a liquid, solid or deep chilled gas. The exothermicity of the reaction is substantially compensated by the energy absorbing capacity of the heterogeneous blowing agent.

15 Claims, No Drawings

PROCESS FOR PRODUCING FOAMED POLYMERS

This is a continuation-in-part of application Ser. No. 07/316,185, filed Feb. 1989 now abandoned.

FIELD OF THE INVENTION

The present invention relates to a process for the production of foamed polymers More specifically, the present invention relates to a process for the production of polyurea foams; examples of such foamed polymers include polyureas and modified polymers thereof.

BACKGROUND OF THE INVENTION

As used throughout this specification, the term "polyurea" is meant to embody the polycondensation product obtained from reaction of a compound containing an isocyanate functional group with a compound containing an active hydrogen functional group. It will be appreciated that "polyurea" encompasses modified and unmodified urea polymers As used throughout this specification, the term "modified polyurea" is meant to embody a urea polymer in which up to 50 percent of the polymer backbone forming linkages have been substituted. Examples of suitable substituents include urethane groups.

The compound containing an active hydrogen functional group may be selected from compounds having one or more groups selected from amino, amido, imino, olamino or combinations thereof disposed on a polymeric (eg. polyester, polyether, polyalkene) backbone. Moreover, any low molecular weight compound which comprises one or more of the functional groups discussed above will be suitable for use. In urethane modified polyureas, some of the active hydrogen is in a hydroxyl function form. The monomer containing an active hydrogen functional group may comprise from about 20 units up to about 25,000 units.

Generally, a urea is the product of a reaction between an isocyanate and an amine:

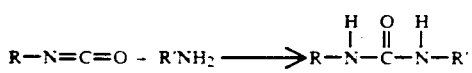

By using a di- or poly-functional isocyanate and a di- or poly-amine, a relatively high molecular weight polymer may be obtained:

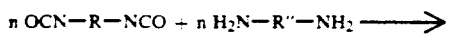

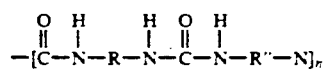

In contract to the production of a urea, a urethane is the product of the reaction between an isocyanate and an alcohol:

By using di- or poly-functional isocyanate and hydroxyl-terminated low molecular weight polymer, the production of a high molecular weight polyurethane may be achieved:

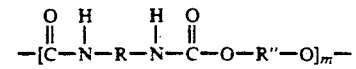

Thus, in order to obtain a high molecular weight polymer each of the isocyanate compound and the active hydrogen-containing compound (i.e. the amine for production of urea and the hydroxyl-terminated low molecular weight polymer for production of urethane) must contain a functionality of greater than 1.

BRIEF DISCUSSION OF THE PRIOR ART

The production of polyurea foams is known in the art. Typically, such foams have closed or open cells, densities in the range of from 7 to 1000 kg/m$^3$ and may exhibit the properties of unfoamed elastomers (depending on the type of foam and its density).

Several techniques have been used to produce polymer foams in general. For example one technique, commonly referred to as "chemical blowing", is often used to produce urethane and urea polymer foams, and utilizes a foaming agent which is produced in situ by the reaction of water and an isocyanate. Another technique, commonly referred to as "physical blowing", utilizes a volatile liquid blowing agent which is mixed with the reacting monomers. The most common type of blowing agents used in "physical blowing" are chlorofluorocarbons, also known as CFC's. In the case of some polymers (e.g. polystyrene, polyethylene, polypropylene and the like), the blowing agents used in "physical blowing" are added to the polymer itself (usually as a molten mixture).

U.S. Pat. No. 3,468,987 (to Speciality Converters, Inc.) teaches a method for preparing a chemical foaming mixture urethane polymer foams. Specifically, the method comprises providing fluid mixture pre-polymer reaction products of a hydroxy-containing resinous compound and a stoichiometric excess of an organic isocyanate compound to form a polyurethane foam. The reaction product is cooled to a temperature which is less than the freezing point of the isocyanate compound. The reaction product containing the frozen isocyanate is mixed intimately with a catalyst mixture containing water and a catalyst. The water reacts with the reaction product to form a chemical foaming mixture. As the temperature of the foaming mixture is increased, "gaseous reaction" occurs resulting in expansion of the foaming mixture. Thus, this patent teaches a process which relates to chemical foaming.

U.S. Pat. No. 3,528,203 (to Shell Oil Company) teaches a process for introducing a volatilizable blowing agent into a thermoplastic polymer. More specifically, the process comprises compacting finely divided polymer particles into a moving compacted mass of solid particles having a void fraction of from 0.6 to 0.2. The blowing agent is introduced as a liquid or fluid in a high-density, supercritical state. The choice of thermoplastic polymer is not particularly restricted.

U.S. Pat. No. 3,745,203 (the Cincinnati Milling Machine Co.) teaches a process for the production of polyurethane moldings. More specifically, the process comprises introducing into a closed mold a non-expanded liquid mixture comprising a polyisocyanate, a polyol and a blowing agent. The mixture is then allowed to expand and fill the mold as the polyurethane is formed. The final step of the process comprises curing and removing the resultant molded article. The key feature of this process resides in the use of a blowing agent which is a volatile material that exhibits a vapor pressure of not more than one atmosphere at 110° F. when mixed with the reactants. The preferred blowing agents are CFC's.

U.S. Pat. No. 3,787,542 (to Imperial Chemical Industries) teaches a process for producing foamed thermoplastics by extrusion using a liquid-gas two component blowing system. One of the blowing agents acts to form a cell center which is thereafter enlarged by expansion of the other blowing agent. The blowing agent used to form the cell center is an inert gas (eg. air, nitrogen).

Unfortunately, the hereinabove described processes of the prior art are fraught with certain deficiencies and disadvantages.

The use of fully halogenated hydrocarbons (eg. CFC's) in industrial processes is currently under scrutiny by the governmental agencies of many countries. It is a well established belief that these halogenated hydrocarbons are detrimental to the protective ozone layer surrounding this planet. Partially halogenated hydrocarbons are acceptable alternatives, at least theoretically, from an environmental point of view. However, for practical reasons, these alternatives are not yet available for industrial usage, and they are also to be phased out in the near future.

The use of "chemical blowing" techniques (e.g. in situ production of $CO_2$ upon reaction of water with an isocyanate) necessitates the use of relatively expensive compounds. Further, the reactions which take place during such a process are generally inherently highly exothermic thereby rendering the process inappropriate for use with highly reactive components—this is especially the case in the production of polyurea foams. Moreover, these processes result in the production of foams with increased amounts of "hard segments" with the result that the product is not appropriate for use in the manufacture of soft and flexible foams.

Nucleation, in and of itself, is not a technique for producing urethane polymer foams. Technically, the nucleation process occurs during virtually all foaming process, both with "chemical" and "physical" blowing agents. Nucleation, if it is based on an inert gas, involves only dissolving and/or suspension of the gas in the polymer forming reactants and the formation of nuclei for future cells. The foaming is then completed by one of the above-mentioned methods using a "chemical" or "physical" blowing agent.

Another known problem associated with the production of polyurea, in general, and polyurea foams, in particular, is the high exothermicity resulting from the concurrent reactions. This is compounded by the fact that polyurea foams are inherently good insulators and thus, the heat of reaction is not well dissipated during the production of polyurea foams. Failure to overcome this problem results in heat buildup within and scorching of the resultant polymer. In the most optimistic case this leads to a deterioration of the product properties. In many cases scorching can lead to the total destruction of the product.

It would be advantageous to have a process for producing polyurea foams which is relatively simple, utilizes blowing agents which are environmentally safe and relatively inexpensive, and overcomes at least some of the above-mentioned deficiencies of the prior art.

SUMMARY OF THE INVENTION

It is an object of the present invention to obviate or mitigate one or more of the above-mentioned deficiencies of the prior art.

Further, it is an object of the present invention to provide a novel process for producing a polyurea foam.

Accordingly, the present invention provides a process for producing a polyurea foam which comprises reacting an isocyanate compound and at least one active hydrogen-containing compound in the presence of a heterogeneous blowing agent;

wherein the heterogeneous blowing agent is a permanent gas which is used at a pressure and a temperature thereby rendering it in the form of a liquid, solid or deep chilled gas, whereby the exothermicity of the reaction is substantially compensated by the energy absorbing capacity of the heterogeneous blowing agent.

Non-limiting examples of suitable heterogeneous blowing agents include permanent gases such as liquid nitrogen, liquid air, solid carbon dioxide and liquid carbon dioxide.

DETAILED DESCRIPTION OF THE PREFERRED EMBODIMENTS

Thus, the process of the present invention is suitable for producing polyurea foams. Examples of such foams include polyurea and modified polymers thereof. An example of a modified polymer of this group includes polyurethane modified polyurea. In a preferred embodiment, the process of the present invention is suitable for use in the production of flexible polyurea foams.

The choice of isocyanate compound suitable for use in the process of the present invention is not particularly restricted. Generally, the isocyanate compound suitable for use may be represented by the general formula:

wherein i is an integer of two or more and Q is an organic radical having the valence of i. Q may be a substituted or unsubstituted hydrocarbon group (e.g. an alkylene or arylene group). Moreover, Q may be represented by the general formula:

wherein Q' is an alkylene or arylene group and Z is chosen from the group comprising —O—, —O—Q'—, —CO—, —S—, —S—Q'—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention relates to the production of polyurea foams, it will be appreciated that in this embodiment, the prepolymer would be used to prepare a polyurethane modified polyurea (i.e. not an unmodified polyurethane) foam.

In another embodiment, the isocyanate compound suitable for use in the process of the present invention may be selected from dimers and trimers of isocyanates and diisocyanates, and from polymeric diisocyanates having the general formula:

[Q''(NCO)$_i$]$_j$ wherein both i and j are integers having a value of 2 or more, and Q'' is a polyfunctional organic radical, and-/or, as additional components in the reaction mixture, compounds having the general formula:

L(NCO)$_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a $=$Si—NCO group, isocyanate compounds derived from sulphonamides (QSO$_2$NCO), cyanic acid and thiocyanic acid.

Specific examples of isocyanate compounds suitable for use in the process of the present invention include 2,4-tolylene diisocyanate, 2,6-tolylene diisocyanate, crude tolylene diisocyanate, bis(4-isocyanatophenyl)methane, diphenylmethylene-4,4'-diisocyanate and crude methylene diisocyanate. It should be appreciated that mixtures containing two or more isocyanate compounds are also suitable for use in the process of the present invention.

Since the process of the present invention relates to the production of polyurea foams, the active hydrogen-containing compound must comprise hydrogen bonded to nitrogen and may be selected from the group comprising polyamines, polyamides, polyimines and polyolamines, preferably polyamines.

Examples of suitable polyamines include primary and secondary amine terminated polyethers having: a molecular weight of greater than 1500; a functionality of from 2 to 6, preferably from 2 to 3; and an amine equivalent weight of from about 200 to about 5000. The preferred polyamines have a molecular of greater than 2500.

Such amine terminated polyethers are typically made from an appropriate initiator to which a lower alkylene (e.g. ethylene, propylene, butylene or mixtures) oxide is added with the resulting hydroxyl terminated polyol being subsequently aminated. If two or more alkylene oxides are used, they may be present as either random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol. Thus, typical amine polyethers suitable for use in the process of the present invention have greater than 50 percent of their active hydrogens in the form of amine hydrogen.

Although the choice of the isocyanate compound and the active hydrogen-containing compound (comprising hydrogen bonded to nitrogen) is not restricted, it should be appreciated that in order for a high molecular weight polymer to be produced it is essential that each of these compounds have a functionality of one or more.

The heterogeneous blowing agent suitable for use in the process of the present invention is a permanent gas. The permanent gas is used in the process at a temperature and a pressure whereby it is in the form of a liquid, a solid or a deep chilled gas. While the choice of blowing agent suitable for use is not particularly restricted, it is preferred to use at least one of the following: liquid nitrogen, liquid air, solid carbon dioxide and liquid carbon dioxide. The use of one or more of these blowing agents obviates the need to use low boiling point hydrocarbons such as chlorofluorocarbons (CFC's), methyl chloride, dichloromethane, n-pentane and other such blowing agents which are detrimental to the environment. It should be appreciated, however, that the heterogeneous blowing agent used in the present process may be used in conjunction with the lower boiling point hydrocarbons described above thereby reducing the required amount of the low boiling point hydrocarbons. Moreover, the process of the present invention mitigates the need to transform a portion of the isocyanate compound to carbon dioxide through a reaction with water ("chemical blowing") and the consequential production of heat due to the exothermicity of the reaction. Moreover, the excessive formation of substituted ureas and urea is limited. It should be appreciated, however, that the process of the present invention may be conducted in conjunction with the transformation of a reduced portion of the isocyanate compound as described above.

The order of addition of the reactants and heterogeneous blowing agent during the process is not particularly restricted. In one embodiment, the isocyanate compound comprises the heterogeneous blowing agent prior to reaction with the active hydrogen-containing compound. In another embodiment, the active hydrogen-containing compound comprises the heterogeneous blowing agent prior to reaction with the isocyanate compound. In yet another embodiment, the active hydrogen-containing compound, the isocyanate compound and the heterogeneous blowing agent are simultaneously contacted.

Thus, the process of the present invention is useful in minimizing or substantially eliminating the harmful effects of excess heat generated from reaction exothermicity during the production of polyurea foams, thereby rendering the process more manageable and preventing scorching of the foam product. It is believed that the energy generated by the reaction serves to volatilize the heterogeneous blowing agent thereby expanding the reaction mass until the polymer becomes a cellular solid. The consumption of the heat energy which is generated during the reaction results in a minute and gradual reduction of the rate of reaction of the concurrent reactions which are responsible for the formation of polyurea foam thereby rendering the entire process more manageable and easier to control.

The heat exchange which occurs between the reaction mass and the heterogeneous blowing agent is localized at a cellular level and results in the exchange of minute amounts of energy. While not wishing to be bound by any specific scientific theory, it is believed that the dissipation of heat is an internally balanced phenomenon which does not depend on the heat transfer capability of the foam product which, as is known in the art, is a very efficient heat insulator. Moreover, this phenomenon does not allow the internal temperature of the foam product to rise to levels where scorching and/or decomposition of the foam will occur. The process of the present invention also reduces the importance of the heat absorbing capacity of the mould used to produce the article (i.e. since the reaction exothermicity is effectively compensated for). The process of the present invention also allows for improved control of process modifications, gelation speed up, continuous foaming rate, in mould time and cell formation and opening. By providing the ability to control such factors, the process of the present invention provides the ability to control product properties such as green strength, compression set, foam durability and other performance properties.

Embodiments of the present invention will now be described with reference to the following examples which are not intended nor should they be construed to limit the scope of the invention. Unless otherwise indicated, all parts are parts by weight.

EXAMPLE 1

A two-component reaction system comprises Component A and Component B. Component A is a preblend of (i) two modified pure 4,4'-methylene diisocyanates (both are commercial products sold by Dow Chemical Europe under the tradenames Isonate 143L and RMA 400) and (ii) tolylene diisocyanate (a commercial product sold by BASF under the tradename TD 80). Component B is a preblend of: 50 parts polyol (a commercial product sold by Dow Chemical Company under the tradename Voranol CP 4703) having a molecular weight of 4700; 35 parts aliphatic polyamine (a commercial product sold be Texaco Inc. under the tradename Jeffamine 5000) having a molecular weight of 5000; 15 parts aromatic diamine (a commercial product sold by Lonza under the tradename DETDA-80); 2 parts silicone surfactant; and 2 parts water.

Component A and Component B are to be mixed using continuous high pressure mixing and dispensing equipment having a modified mixhead to control both pressure and temperature. The mixhead is capable of being operated under a variety of mixing pressures in the range of from 100 to 240 bars. The mixing ratio is adjusted for an index of 100, 105 and 110. Liquid $N_2$ is used as a blowing agent and is introduced through a specially designed needle valve. The temperature of the reacting mass is recorded with a thermocouple located on the mixhead. The apparatus used for the admission of the liquid $N_2$ and Component B of the reaction system is a modified needle valve in which the liquid $N_2$ is injected as a concentric stream into the valve containing Component B of the reaction system.

The liquid $N_2$/Component B slurry is then impingement mixed with Component A of the reaction system. The reaction mass, a polyurethane modified polyurea, is continuously withdrawn from the mixhead and is cured for one hour at ambient temperature.

EXAMPLE 2

60 g and 40 g of aliphatic polyamines having molecular weights of 5000 and 2000, respectively (both commercial products sold by Texaco Inc. under the tradenames Jeffamine 5000 and Jeffamine 2000, respectively) are blended together with 2 g of silicone surfactant and 1.4 g of water to form Component B of a two-component polyurea system. Component A of the reaction system comprising crude polymeric methylene diisocyanate.

Component A and Component B are mixed together using the procedure described in Example 2 except that the liquid $N_2$ (blowing agent) is metered directly into the mixhead to control the rate of reaction and the density of the product foam.

We claim:

1. A process for producing a polyurea foam comprising one of unmodified polyurea and modified polyurea in which up to 50 percent of the urea therein has been substituted, said process comprising the steps of: (i) reacting an isocyanate compound and at least one active hydrogen-containing compound in the presence of a blowing agent which is a permanent gas having an energy absorbing capacity and is selected from the group consisting essentially of liquid nitrogen, liquid air, solid carbon dioxide and liquid carbon dioxide, and (ii) using the energy absorbing capacity of said blowing agent to compensate substantially for the exothermicity of the reaction in step (i).

2. The process defined in claim 1 wherein said heterogeneous blowing agent is used in conjunction with a low boiling point hydrocarbon selected from the group comprising chlorofluorocarbons, dichloromethane, methyl chloride and n-pentane.

3. The process defined in claim 1, wherein said heterogeneous blowing agent is liquid nitrogen.

4. The process defined in claim 1, wherein said heterogeneous blowing agent is solid carbon dioxide.

5. The process defined in claim 1, wherein said isocyanate compound comprises said heterogeneous blowing agent prior to reaction with said hydrogen-containing compound.

6. The process defined in claim 1, wherein said hydrogen-containing compound comprises said heterogeneous blowing agent prior to reaction with said isocyanate compound.

7. The process defined in claim 1, wherein said hydrogen-containing compound, said isocyanate compound and said heterogeneous blowing agent are simultaneously contacted.

8. The process defined in claim 1, wherein said isocyanate compound is chosen from the group of compounds represented by the general formula:

wherein i is an integer having a value of 2 or more and Q is selected from the group comprising substituted hydrocarbons, unsubstituted hydrocarbons, polyurea radicals and Q'—Z—Q'; wherein Q' is an alkylene or arylene group and Z is selected from the group comprising —O—, —O—Q'—, —CO—, —S—, —S—Q'—S— and —SO$_2$—.

9. The process defined in claim 8, wherein said isocyanate compound is selected from the group comprising hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diixocyanate, naphthalene-1,5-diisocyanate, triphenylmethane- 4,4',4"-triisocyanate and isopropylbenzene-alpha-4-diisocyanate.

10. The process defined in claim 1, wherein said isocyanate compound is selected from the group comprising 2,4-tolylene diisocyanate, 2,6-tolylene diisocyanate, crude tolylene diisocyanate, bis(4-isocyanatophenyl)methane, diphenylmethylene-4,4'-diisocyanate and crude methylene diisocyanate.

11. The process defined in claim 8, wherein said hydrogen-containing compound is selected from the group comprising polyamines, polyamides, polyimines and polyolamines.

12. The process defined in claim 9, wherein said hydrogen-containing compound is a polyamine.

13. The process defined in claim 10, wherein said hydrogen-containing compound is a polyamine selected from the group comprising primary and secondary amine terminated polyethers having: a molecular weight of greater than 1500; a functionality of from 2 to 6; and an amine equivalent weight of from about 200 to about 5000.

14. The process defined in claim 1, wherein said heterogeneous blowing agent is liquid carbon dioxide.

15. The process defined in claim 1, wherein said heterogeneous blowing agent is liquid air.

* * * * *